No. 651,945. Patented June 19, 1900.
C. L. BUNDY.
ELECTRIC MOTOR.
(Application filed June 6, 1898.)

(No Model.)

Witnesses
H. B. Hallock.
Samuel Stuart

Inventor:
Clifton L. Bundy.
by Geo. C. Hazelton Jr.
Attorney

UNITED STATES PATENT OFFICE.

CLIFTON L. BUNDY, OF PHILADELPHIA, PENNSYLVANIA.

ELECTRIC MOTOR.

SPECIFICATION forming part of Letters Patent No. 651,945, dated June 19, 1900.

Application filed June 6, 1898. Serial No. 682,697. (No model.)

*To all whom it may concern:*

Be it known that I, CLIFTON L. BUNDY, a citizen of the United States, residing at Philadelphia, in the county of Philadelphia and State of Pennsylvania, have invented a certain new and useful Improvement in Electric Motors, of which the following is a specification.

My invention relates to a new and useful improvement in electric motors and dynamos, and especially to those known as "magneto-electric machines," and has for its object to provide a simple and effective device of this description in which the wire is wound only upon the armature.

With this end in view the invention consists in the details of construction and combination of elements hereinafter set forth and then specifically designated by the claim.

The construction and operation will now be described in detail, referring to the accompanying drawings, forming a part of this specification, in which—

Figure 1:
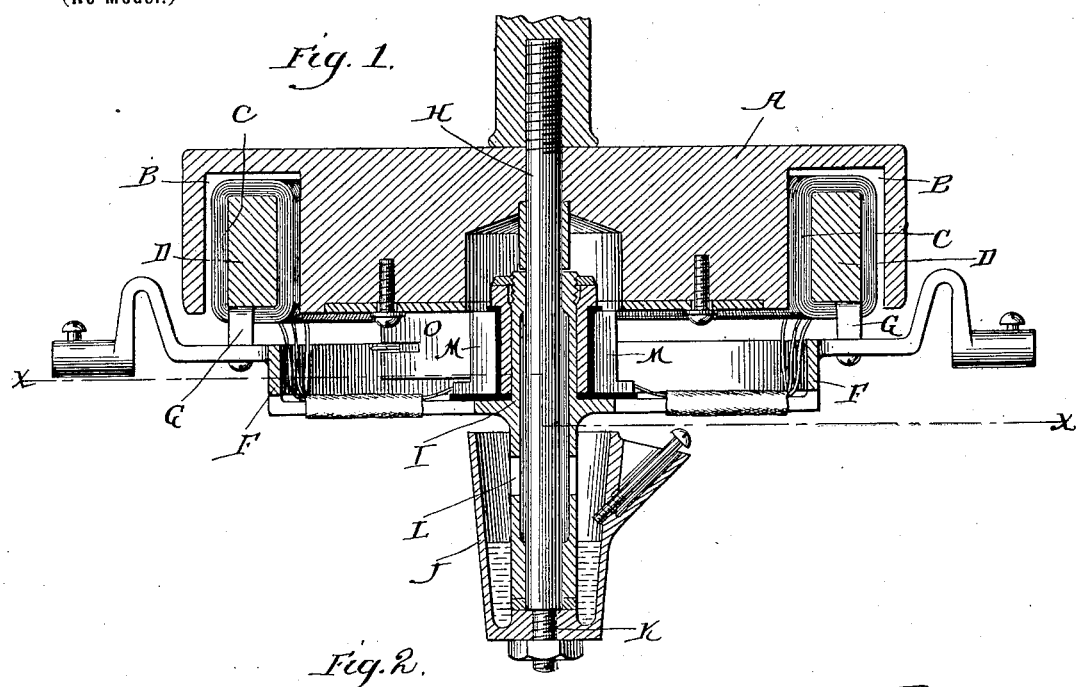
Figure 2:
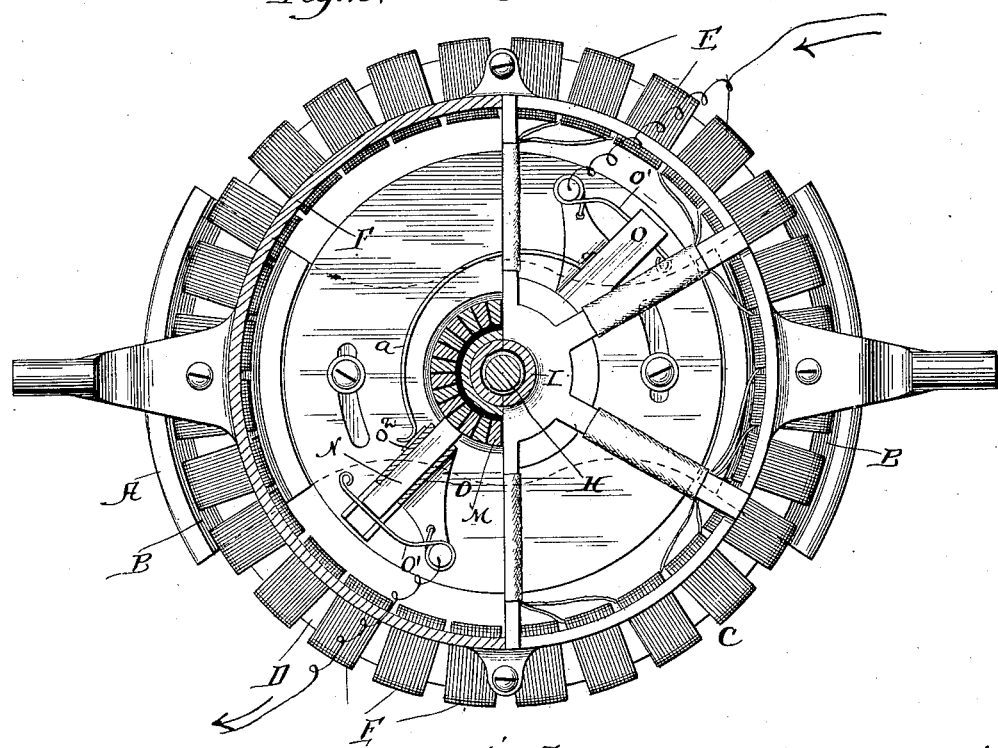

Figure 1 is a central cross-section of a motor made in accordance with my improvement; Fig. 2, a bottom plan view, and Fig. 3 a section showing a modification of the field illustrated in Fig. 1.

In carrying out my invention as here embodied I provide a field member A, which may be of steel, cast-iron, or laminated iron, here shown as solid and bipolar, and this field member has channels B formed therein adapted to receive and permit the revolving of the armature C therein. The core D of the armature is circular and may be of steel, cast-iron, or laminated iron, with or without teeth, and around this core is wound in proper section the wire E for the energizing of the armature.

A spider F is provided for the support of the armature and is connected therewith by the posts G, both the spider and post being of non-magnetic material, and this spider is adapted to revolve upon the central spindle H by the hub I being journaled thereon, and for convenience in lubricating this bearing a thimble-shaped cup J is threaded upon the lower end of the spindle, as indicated at K, and extends upward around the hub in such manner as to hold a quantity of oil, which latter is admitted to the bearing through the hole L. A commutator M is carried by the spider, and the brushes N are arranged to bear thereagainst, said brushes being supported by the arms O, which are secured upon the spider. Any suitable means may be utilized for the transmission of motion from the armature to the work to be accomplished. The brushes are here shown as consisting of blocks of carbon or other suitable material set in the hollow arms O, which act as guides for said brushes, and springs O' are arranged to bear upon the outer ends of said brushes, so as to force them inward against the commutator. From this description it will be seen that the electric current transmitted to the wire coils C will energize the armature, the magnetic lines of force emanating therefrom so acting upon the field member as to bring about a counter magnetic force, which will cause the armature to revolve, thus avoiding the necessity of winding the field, and it is to be noted that the field member is not a permanent magnet, but depends entirely upon the counter magnetic force developed therein by the magnetism generated in the armature.

Figure 3:
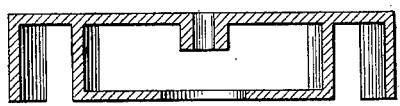

In Fig. 3 I have illustrated a slightly-modified form of the field member, which has an open space R formed in the central portion thereof, thus reducing its weight and avoiding the retention of residuary magnetism, thereby permitting the changes therein to more rapidly take place.

Of course any number of poles may be used upon the field member, and it is also obvious that the field may be the revolving member, while the armature may remain stationary. This is accomplished by rotating the brushes with the field member and attaching two collecting-rings for conveying the current to the armature. The magnetic lines of force emanating from the energized armature-coils act upon the field member same as before stated.

A motor constructed in accordance with my improvement can be used in connection with either a direct or alternating current.

*a* shows an automatic short-circuiting device for carrying the current in case anything should happen to the brushes, thus avoiding the burning out of the armature-winding. The arm *o* is provided with a plate of non-conducting material $o^2$, against which the curved end of the short-circuiting device rests, said plate being of such material and of such thickness as to be penetrated by the current in case the current is abnormal. Under ordinary conditions the circuit would be from the armature to the communication through the wiring shown and from the communication through the brushes, brush-holders, and the wires connected to the brush-holders. In case of abnormal current the non-conducting material would fuse, and the short-circuiting arm $a$ would contact with the brush-holder and the current would then pass from one brush to the other.

Other slight modifications might be made in the construction here shown without departing from the spirit of my invention, and I therefore do not wish to be limited to these exact details.

Having thus fully described my invention, what I claim as new and useful is—

In an electric motor, a field member having channels, an armature, comprising a circular core having wound thereon sections of wire lying in the channels of the field member, a spider below the armature, posts secured to the core of the armature and supported by the spider, said spider having a hub journaled on a central spindle, a commutator carried by the spider, brush-holding arms, brushes therein bearing against the commutator, springs secured to the brush-holders and bearing against the outer ends of the brushes, a short-circuiting arm secured to one brush-holder at one end and having its opposite end bearing against a fusible disk on the opposite brush-holder.

In testimony whereof I have hereunto affixed my signature in the presence of two subscribing witnesses.

CLIFTON L. BUNDY.

Witnesses:
JOSHUA R. MORGAN,
FRANK M. BOLTON, Jr.